United States Patent [19]

Hideshima et al.

[11] 4,316,260
[45] Feb. 16, 1982

[54] SEQUENCE DISPLAY CONTROLLING METHOD AND CONTROLLER

[75] Inventors: Keiji Hideshima, Fujisawa; Haruo Koyanagi, Ome; Hiroharu Suda, Yokohama; Hirokazu Sawano, Hitachi; Masaoki Takaki, Hitachi; Kunio Yamanaka, Hitachi; Isao Yasuda, Hitachi; Kazuyoshi Asada, Hitachi, all of Japan

[73] Assignees: Hitachi, Ltd.; Nissan Motor Co., Ltd., both of Tokyo, Japan

[21] Appl. No.: 75,221

[22] Filed: Sep. 13, 1979

[30] Foreign Application Priority Data

Sep. 13, 1978 [JP] Japan ............................ 53-111661

[51] Int. Cl.³ .................... G06F 3/153; G06F 9/06
[52] U.S. Cl. .................................................. 364/900
[58] Field of Search ... 364/900 MS File, 200 MS File, 364/107

[56] References Cited

U.S. PATENT DOCUMENTS

| | | | |
|---|---|---|---|
| 3,686,639 | 8/1972 | Fletcher | 364/200 |
| 3,944,987 | 3/1976 | Koyanagi et al. | 364/900 |
| 3,964,026 | 6/1976 | Yamauchi et al. | 364/900 |
| 3,965,457 | 6/1976 | Harwood | 364/900 |
| 3,982,230 | 9/1976 | Burkett | 364/900 |

OTHER PUBLICATIONS

Saba, R. T., *Pushbutton Wiring Replaces Relays* (IGA/1971 Sixth Annual Meeting of the IEE Ind. & Gen'l Appli. Group.), pp. 1043-1051).

*Primary Examiner*—Harvey E. Springborn
*Attorney, Agent, or Firm*—Craig and Antonelli

[57] ABSTRACT

A programmable sequence controller is provided with a display signal processor for preparing and correcting a sequence program in combination with a CRT (or cathode ray tube) display device. The signal processor simply effects signal processing of branch points and composition points in case where a so-called "ladder diagram" constituting the sequence diagram with relay symbols is prepared and displayed. Branch information is stored in an FIFO (or first in first out) register. The branch information is sequentially received and stored, and the information thus stored is read out in the order of storage, thus preparing the ladder diagram. There are provided a register for instructing the FI operation and a register for instructing the FO operation. The sequence display controller is applicable to the cases where a new ladder diagram is to be prepared, the diagram once prepared is corrected, and the operation is checked.

5 Claims, 13 Drawing Figures

|   |   | (MSB) | | | | | | | | | | | | | | | (LSB) |
|---|---|---|---|---|---|---|---|---|---|---|---|---|---|---|---|---|
|   |   | 15 | 14 | 13 | 12 | 11 | 10 | 9 | 8 | 7 | 6 | 5 | 4 | 3 | 2 | 1 | 0 |
| ① | COLUMN REGISTER | X | X | X | X | X | X | X | X | X | X | X | X | X | X | X | X |
|   | I REGISTER | 1 | 0 | 0 | 0 | 0 | 0 | 0 | 0 | 0 | 0 | 0 | 0 | 0 | 0 | 0 | 0 |
|   | J REGISTER | 1 | 0 | 0 | 0 | 0 | 0 | 0 | 0 | 0 | 0 | 0 | 0 | 0 | 0 | 0 | 0 |
| ② | COLUMN REGISTER | X | X | X | X | X | X | X | X | X | X | X | X | X | X | X | X |
|   | I REGISTER | 1 | 0 | 0 | 0 | 0 | 0 | 0 | 0 | 0 | 0 | 0 | 0 | 0 | 0 | 0 | 0 |
|   | J REGISTER | 1 | 0 | 0 | 0 | 0 | 0 | 0 | 0 | 0 | 0 | 0 | 0 | 0 | 0 | 0 | 0 |
| ③ | COLUMN REGISTER | 1 | X | X | X | X | X | X | X | X | X | X | X | X | X | X | X |
|   | I REGISTER | 0 | 1 | 0 | 0 | 0 | 0 | 0 | 0 | 0 | 0 | 0 | 0 | 0 | 0 | 0 | 0 |
|   | J REGISTER | 1 | 0 | 0 | 0 | 0 | 0 | 0 | 0 | 0 | 0 | 0 | 0 | 0 | 0 | 0 | 0 |
| ④ | COLUMN REGISTER | 1 | 0 | X | X | X | X | X | X | X | X | X | X | X | X | X | X |
|   | I REGISTER | 0 | 0 | 1 | 0 | 0 | 0 | 0 | 0 | 0 | 0 | 0 | 0 | 0 | 0 | 0 | 0 |
|   | J REGISTER | 1 | 0 | 0 | 0 | 0 | 0 | 0 | 0 | 0 | 0 | 0 | 0 | 0 | 0 | 0 | 0 |
| ⑤ | COLUMN REGISTER | 1 | 0 | 0 | X | X | X | X | X | X | X | X | X | X | X | X | X |
|   | I REGISTER | 0 | 0 | 0 | 1 | 0 | 0 | 0 | 0 | 0 | 0 | 0 | 0 | 0 | 0 | 0 | 0 |
|   | J REGISTER | 1 | 0 | 0 | 0 | 0 | 0 | 0 | 0 | 0 | 0 | 0 | 0 | 0 | 0 | 0 | 0 |
| ⑥ | COLUMN REGISTER | 1 | 0 | 0 | 1 | X | X | X | X | X | X | X | X | X | X | X | X |
|   | I REGISTER | 0 | 0 | 0 | 0 | 1 | 0 | 0 | 0 | 0 | 0 | 0 | 0 | 0 | 0 | 0 | 0 |
|   | J REGISTER | 0 | 1 | 0 | 0 | 0 | 0 | 0 | 0 | 0 | 0 | 0 | 0 | 0 | 0 | 0 | 0 |
| ⑦ | COLUMN REGISTER | 1 | 0 | 0 | 1 | X | X | X | X | X | X | X | X | X | X | X | X |
|   | I REGISTER | 0 | 0 | 0 | 0 | 1 | 0 | 0 | 0 | 0 | 0 | 0 | 0 | 0 | 0 | 0 | 0 |
|   | J REGISTER | 0 | 0 | 1 | 0 | 0 | 0 | 0 | 0 | 0 | 0 | 0 | 0 | 0 | 0 | 0 | 0 |

FIG. 12B

|  | (MSB) | | | | | | | | | | | | | | | (LSB) |
|---|---|---|---|---|---|---|---|---|---|---|---|---|---|---|---|---|
|  | 15 | 14 | 13 | 12 | 11 | 10 | 9 | 8 | 7 | 6 | 5 | 4 | 3 | 2 | 1 | 0 |
| ⑧ COLUMN REGISTER | 1 | 0 | 0 | 1 | X | X | X | X | X | X | X | X | X | X | X | X |
| I REGISTER | 0 | 0 | 0 | 0 | 1 | 0 | 0 | 0 | 0 | 0 | 0 | 0 | 0 | 0 | 0 | 0 |
| J REGISTER | 0 | 0 | 0 | 1 | 0 | 0 | 0 | 0 | 0 | 0 | 0 | 0 | 0 | 0 | 0 | 0 |
| ⑨ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 1 | 0 | 0 | 0 | 0 | 0 | 0 | 0 | 0 | 0 | 0 | 0 | 0 |
| ⑩ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 0 | 1 | 0 | 0 | 0 | 0 | 0 | 0 | 0 | 0 | 0 | 0 | 0 |
| ⑪ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 0 | 1 | 0 | 0 | 0 | 0 | 0 | 0 | 0 | 0 | 0 | 0 | 0 |
| ⑫ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 0 | 1 | 0 | 0 | 0 | 0 | 0 | 0 | 0 | 0 | 0 | 0 | 0 |
| ⑬ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 0 | 0 | 1 | 0 | 0 | 0 | 0 | 0 | 0 | 0 | 0 | 0 | 0 |
| ⑭ COLUMN REGISTER | 1 | 0 | 0 | 1 | 0 | X | X | X | X | X | X | X | X | X | X | X |
| I REGISTER | 0 | 0 | 0 | 0 | 0 | 1 | 0 | 0 | 0 | 0 | 0 | 0 | 0 | 0 | 0 | 0 |
| J REGISTER | 0 | 0 | 0 | 0 | 0 | 1 | 0 | 0 | 0 | 0 | 0 | 0 | 0 | 0 | 0 | 0 |

SEQUENCE DISPLAY CONTROLLING METHOD AND CONTROLLER

The present invention relates to a sequence display controller, and more particularly to a programmable logic controller (which will be referred to herein as a "PLC") for reading out a sequence program, which is stored in a memory device, to effect a sequence of operations.

In this instance, in order to prepare a sequence program stored in the PLC or read a program previously stored in the PLC for check or change of the stored program, an attempt has been made to use the PLC in combination with a CRT display. That is, in the preparation of a program the program is prepared by key operation of a keyboard associated with the CRT to effect display of predetermined symbols, e.g., a ladder symbol display, and is then stored in a memory. When program check or program change is needed, key operation is performed by designated procedures, so that a desired program is read out in a ladder symbol representation on the CRT screen.

The present invention is directed particularly to signal processing of branch and composition points in a ladder symbol representation for the preparation or display of sequence program. Some sequence circuits have a number of branch points and composition points, so that signal processings at those points become important. The present invention is concerned with a sequence display method and apparatus for processing signals of those branch and composition points using a simplified first-in-first-out (FIFO) register.

One of the prior art sequence display controllers has resorted to use of a combination of electromagnetic relays. In view of the lifetime, maintenance, flexibility to changes in programs and the like, however, that type of sequence controller is not always satisfactory. As a result, a so -called "programmable logic controller", which has its sequence programs stored in advance for read out of the sequence operations and which is able to compose any desired sequence by changing the programs, has been used in a wide variety of applications in place of the prior relay-type sequence controller.

In this instance, the CRT has often been used as a display means partly for confirming the information stored and partly for preparing and storing the sequence circuit with the use of its display screen.

For instance, in the publication of RICHARD T. SABA: PUSHBUTTON WIRING REPLACES RELAYS, IEEE Conference Record of 1971 Sixth Annual Meeting of the IEEE Industry and General Applications Group, Oct. 21, 1971, (Rdp-THU-1) pp 1043-1051, there is disclosed a technical concept, in which keys corresponding to the symbols and connections of a ladder diagram are provided so that preparation of any sequence circuit may be carried out with the use of the CRT display by operating those keys.

In U.S. Pat. No. 3,964,026 entitled "SEQUENCE BLOCK DISPLAY SYSTEM", moreover, there is disclosed a sequence block display system, in which a sequence control block to be monitored is automatically located from the sequence procedures stored in a memory so that the circuit thereof may be displayed and in which the circuit so located is displayed with symbols corresponding to the conditions of the composing elements.

One of the closest prior art systems to the present invention is exemplified by the system disclosed in U.S. Application Ser. No. 139,760, filed Apr. 14, 1980, which is a continuation of abandoned U.S. Application Ser. No. 906,986 filed by H. SUDA et al on May 17, 1978, and entitled "SEQUENCE CONTROL SYSTEM", which application is owned by the same assignees (i.e., NISSAN MOTOR CO., LTD. and HITACHI LTD.) as that of the present patent application. According to this disclosure, the relay points (i.e., the connection points with other relay contacts) in a sequence circuit are stored as to their conduction in column registers, which are assigned to the respective columns, so that the connections between the elements of a ladder diagram are performed by reading out the contents of the aforementioned column registers, thus sequentially building the desired sequence circuit.

The present invention represents an improvement over the U.S. Patent application mentioned above, as will be described in detail hereinafter.

It is therefore a major object of the present invention to provide a novel display signal processor for a sequence controller which is suitable for a PLC.

Another object of the present invention is to provide a novel display signal processor which is operative to simply effect the display of a ladder diagram for sequence control.

Still another object of the present invention is to provide a novel display signal processor which is operative to simply process, especially, the signals of branch and composition points in the display of the ladder diagram for the sequence control.

According to a feature of the present invention, there is provided a register which is operative to sequentially store the branch point signals in case the display of the ladder diagram for the sequence control is sequentially effected between common buses.

According to another feature of the present invention, the composition point signals in case the display of the ladder diagram for the sequence control is sequentially effected are processed by reading out the signals of the register, in which the aforementioned branch point signals are sequentially stored, in the order of the storage.

According to still another feature of the present invention, there are provided both a register which has an FI (i.e., first in) bit position and a register which has an FO (i.e., first out) bit position, thereby to effect a FIFO (i.e., first in first out) operation.

This invention relates to apparatus for preparation and display of a sequence ladder diagram. Particularly, this invention is such that signal processing of branch or join points in the diagram is performed using a FIFO column register and two other registers (I, J-registers) to thereby produce a selection signal for on-indication and off-indication in the diagram display. A predetermined display area of a ladder diagram is divided into a plurality of rows and columns. Each branch information in the column thus divided is inputted from a sequence block start (SBS) as the start point on a (first) row in each block to a FIFO column register (embodied as a column register) having bits equal in number to at least the number of columns sequentially. Upon the display of a subsequent row, branch information on the previous row stored in the FIFO is read out in a first-in-first-out order and is combined with other diagram information on the row to be displayed. The branch information on the next row is sequentially inputted to the FIFO register. In this manner, the ladder diagram having a plurality of rows and columns is displayed sequentially.

The present invention will be apparent from the following detailed description taken in conjunction with the accompanying drawings, in which.

Figure 1:
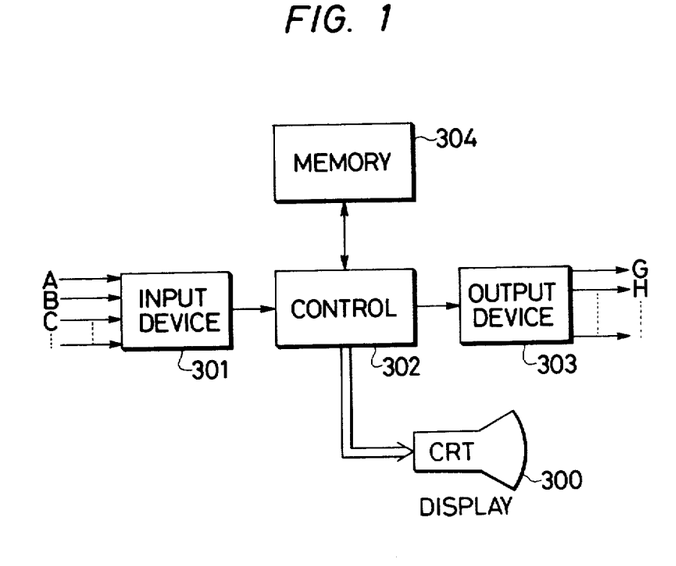
FIG. 1 is a block diagram showing the overall construction of a PLC.

First of all, the features forming the basis of the present invention will be described in the following. FIG. 1 is a block diagram showing the overall construction of a PLC. Input contact information signals A, B, C and so on, which are transmitted from the processes controlled by the PLC, are fed to an input device 301. This input device 301 is made operative to selectively receive the aforementioned contact information signals to thereby feed the same to a control 302. In this control 302, the sequence instructions stored in a memory 304 are carried out so that the results are fed to an output device 303. The resultant signals are conduction control signals of relays G, H and so on.

The memory 304 stores the sequence program including the sequence instructions to be carried out by the control 302. That sequence control is sequentially read out for the operations in the control 302. Incidentally, reference numeral 300 indicates a CRT display.

Figure 2:
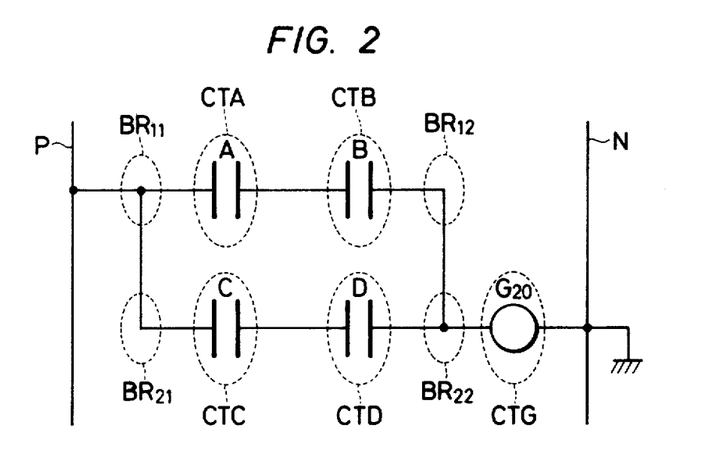
FIGS. 2 and 3 show ladder diagrams exemplifying a sequence circuit using relay symbols.
Figure 3:
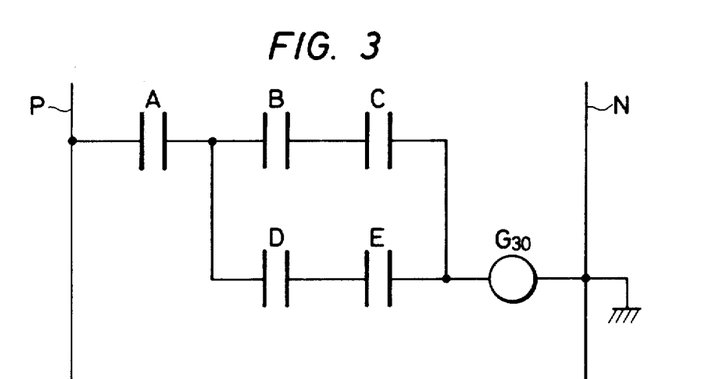

The ladder diagrams of the sequence circuit to be processed are shown in FIGS. 2 and 3. FIG. 2 shows the case of such a sequence logic circuit which may be expressed by the following logic equation:

$$G_{20} = A \cdot B + C \cdot D \quad (1)$$

whereas FIG. 3 shows the case of a sequence logic circuit which may be expressed by the following logic equation:

$$G_{30} = A(B \cdot C + D \cdot E) \quad (2)$$

These examples are remarkably simple, and the practical case takes more complex logic forms.

Indicated by reference letters P and N in FIGS. 2 and 3 are common buses, of which the bus P equivalently shows the positive side of the power source of a relay sequence circuit, whereas the bus N equivalently shows the negative side thereof, which is generally grounded.

Letters A, B, . . . , E show respective ON and OFF contacts, all of which are shown in their "OFF" state in FIGS. 2 and 3. $G_{20}$ and $G_{30}$ represent the outputs which are generated in accordance with the logic equations (1) and (2) and represent the signals which normally energize the relay coils.

Here, the ladder diagrams illustrated are those which are conventionally familiar, and the actual logic operations are carried out in accordance with the programs which are stored in the memory 304.

Figure 4:
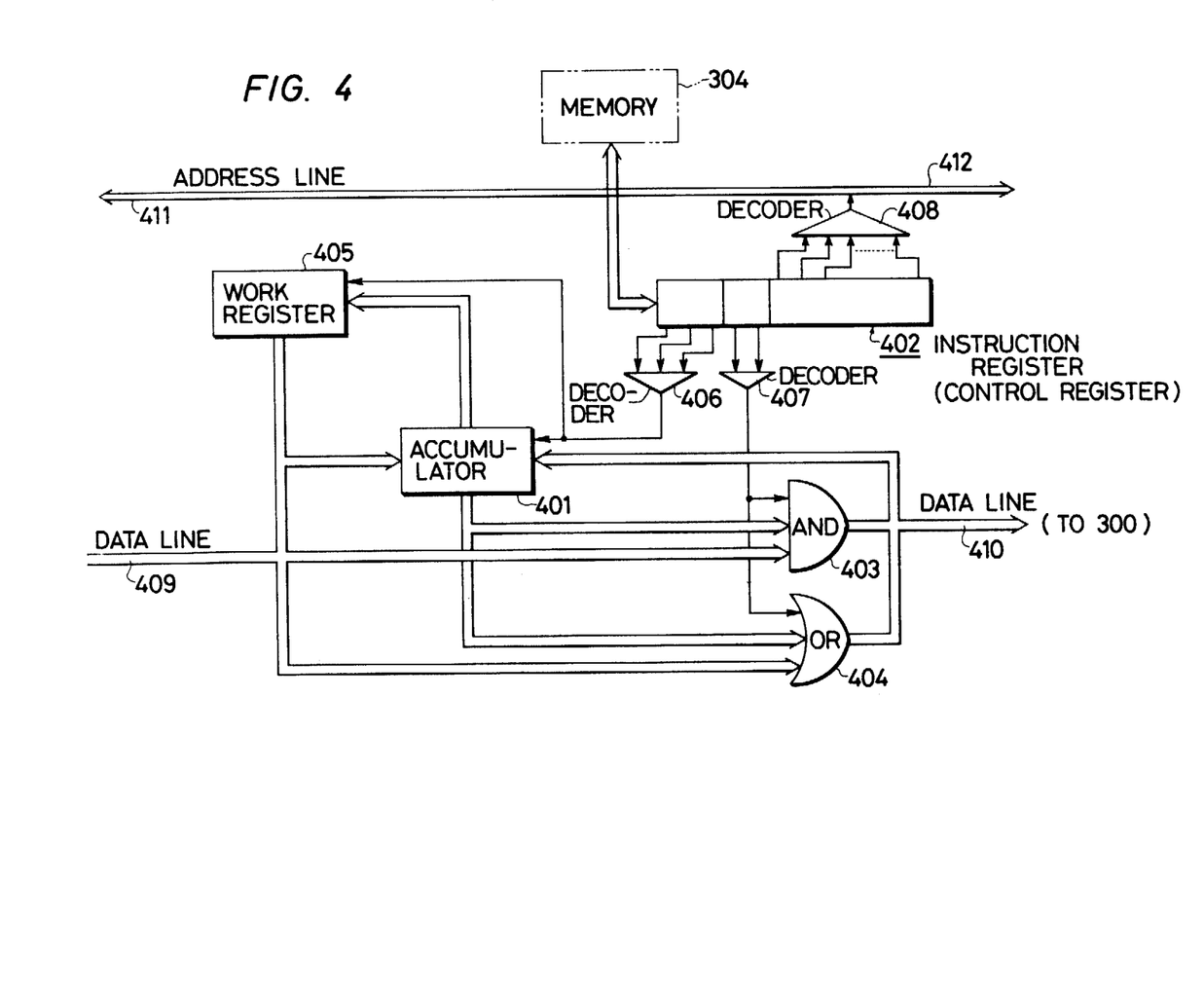
FIG. 4 is a block diagram showing the construction of an operation control.

The specific example of the control 302 in the above construction is shown in FIG. 4, in which: numeral 401 indicates an accumulator (which will be more simply referred to herein as "ACC") to be used in the operations; numeral 402 indicates an instruction register for registering the sequence instruction fed out of the memory; numeral 403 indicates an AND gate; numeral 404 indicates an OR gate; numeral 405 indicates a work register (which will be more simply referred to herein as "WK"); numerals 406, 407 and 408 indicate decoders for decoding the respective sequence instructions; numeral 409 indicates a data line leading from the input device 301; numeral 410 indicates a data line leading to the output device 303; numeral 411 indicates an address line for instructing the input device 301 of which contact is to be selected; and numeral 412 indicates an address line for instructing the output device 303 of which relay is to be selected. The operations of the PLC will be tabulated in the following by taking the sequence circuit of FIG. 2 as an example.

First of all, the logic equation (1) is tabulated in the following if it is coded with the use as assembler instructions for a sequence.

TABLE 1

| Memory Address | Sequence Instruction | | Operation |
|---|---|---|---|
| 1 | LOAD | A | ① (A) → ACC<br>② 0 → WK |
| 2 | AND | B | ① (B) . (ACC) → ACC<br>① (ACC) + (WK) → ACC |
| 3 | OR | C | ② (C) → ACC |
| 4 | AND | D | ① (D) . (ACC) → ACC<br>① (ACC) + (WK) → ACC |
| 5 | SET | $G_{20}$ | ② (WK) → $G_{20}$ |

The operations of the PLC for carrying out those sequence instructions are fed to the instruction register 402 in the control 302, when the first LOAD A is read out of the memory 304, so that they are decoded by the decoders 406, 407 and 408. As a result, the information relating to the operation state of the input contact A is fed through the data line 409 to the ACC 401. Then, the data bit 0 is stored in the WK 405.

When the second instruction AND B is read out and decoded, the condition of the input contact B and the AND operation results by the AND gate 403 are stored in the ACC 401.

When the third instruction OR C is then read out and decoded, the OR operation is carried out between the contents of the ACC and WK by the OR gate 404, and the result is fed to the ACC.

Then, the condition of the input contact C is fed to the ACC.

When the fourth instruction AND D is read out and decoded, the AND operation is carried out between the condition of the input contact D and the content of the ACC, and the result is fed to the ACC.

When the fifth instruction SET $G_{20}$ is read out and decoded, the result coming from the OR operation between the contents of the ACC 401 and the WK 405 is stored in the WK 405. Then, the content of the WK 405 is fed to the output relay $G_{20}$.

Thus, the operations of the sequence circuit, as expressed by the Boolean equation (1), are carried out.

Here, there are two methods for storing the aforementioned sequence program in the memory 304, as follows:

(1) In a sequencer with no function of translating a sequence program as coded above into a machine language, the sequence program is translated by another computer and the result is stored in the memory 304. This is a method of storing in a memory the result of processing by a computer having a translation function when needed; and;

(2) The drawing of the sequence circuit itself is displayed in a man-machine communication manner upon the CRT display attached to the PLC by means of a keyboard and is decoded by the PLC itself so that it may be translated into instructions and stored in the memory.

This method (2) is desired partly because the sequence programmer need not recognize the instructions or assembler words and partly because no other computers are required.

Moreover, the method (2) is characterized by the fact that the sequence circuit prepared by the programmer himself can be checked by displaying it on the CRT.

The present invention is applied to the case in which the method (2) is put into practice.

Figure 5:
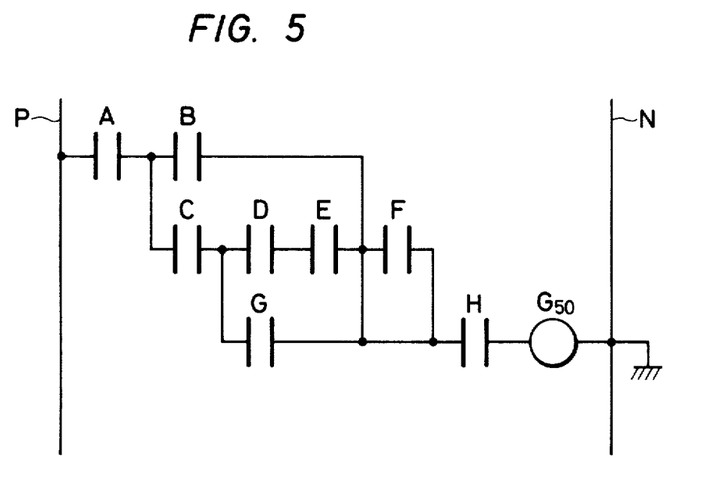
FIGS. 5 and 6 are diagrams of other examples of sequence circuits.
Figure 6:
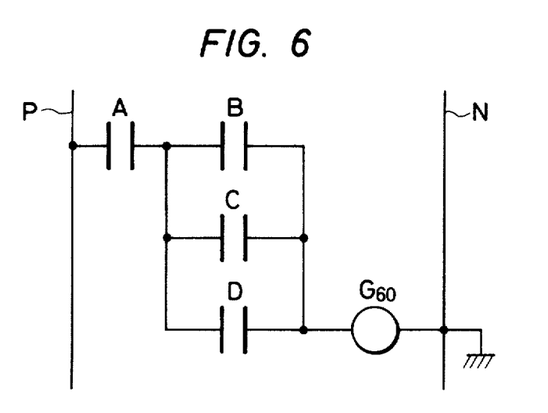

However, another problem is raised in case the sequence circuit is prepared by the method (2) so that it is displayed in the CRT and fed to the aforementioned memory. In the case of the ladder diagram of FIG. 5 or 6, it may not be possible to define the circuit in terms of a Boolean algebra equation, or this equation may not correspond directly to the sequence circuit. More specifically, in the example of FIG. 6, the following three expressions can be obtained:

$$\left. \begin{array}{l} A(B + C + D) = G_{60} \\ A(B + (C + D)) = G_{60} \\ A((B + C) + D) = G_{60} \end{array} \right\} \quad (3)$$

In the above equations, letters A, B, ..., D designate the OFF conditions of the respective contacts.

One of the solutions for the above problem is disclosed in the aforementioned U.S. Application Ser. No. 139,760. For details, reference to the specification is requested, but an abstract thereof will be presented in the following description with reference to FIG. 7.

Figure 7:
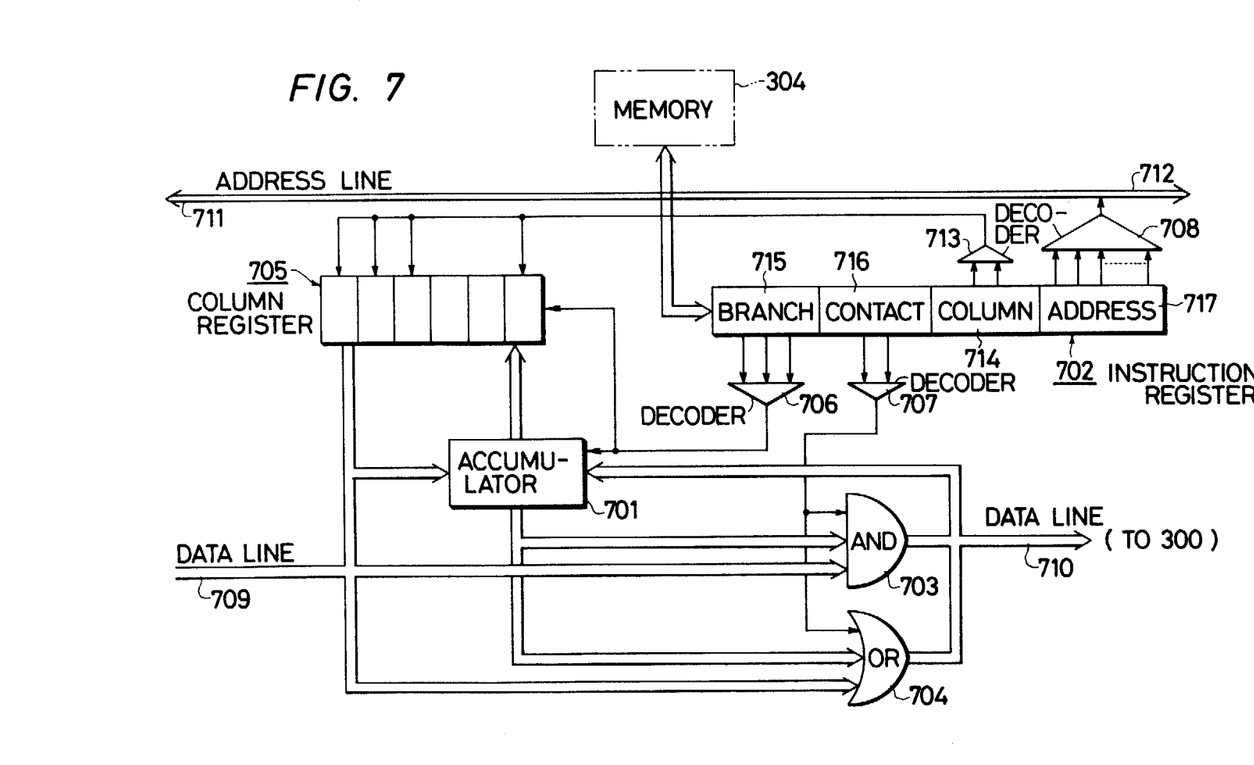
FIG. 7 is a circuit diagram showing an example of a prior system in which the branch points are processed with the use of column registers.

In FIG. 7, the column portion 714 of an instruction register 702 is a portion showing which register of a column register group 705 is indicated by the instruction and is different from the instructions found in the system of FIG. 4 in this respect. Numeral 713 indicates the decoder of the column data, and the column register group 705 plays the role of the work register 405 of FIG. 4. Numerals 715, 716 and 717 indicate branch, contact and address portions of register 702, respectively. Moreover, numeral 701 indicates an accumulater; numeral 703 an AND gate; numeral 704 an OR gate; numerals 706, 707 and 708 decoders; numeral 709 an input contact data line; numeral 710 an output relay data line; numeral 711 an input contact address line; and numeral 712 an output relay address line.

By taking again the sequence circuit of FIG. 2 as an example, the operations of the PLC of FIG. 7 will be described in the following.

The CRT display is supplied with such inputs as itemized in Table 2(A):

TABLE 2(A)

| For First Row: | 1st Column | SBS ├── |
| | 2nd Column | ─┤ ├─ A |
| | 3rd Column | ─┤ ├─ B |
| | 4th Column | ─┐ |
| For Second Row: | 2nd Column | └┤ ├─ C |
| | 3rd Column | ─┤ ├─ D |
| | 4th Column | ─┴─○─ $G_{20}$ |

Remarks:
SBS indicates the head of the Sequence Block.

If this sequence block is translated into mechanical words, it is tabulated as in Table 2(B), wherein letters $OP_1$ and $OP_2$ indicate the branch 715 and the contact 716 of FIG. 7, respectively.

TABLE 2(B)

| Address | Input signal | $OP_1$ | $OP_2$ | Column | Address |
|---|---|---|---|---|---|
| 1 | SBS ├─ | SBS | — | — | — |
| 2 | ─┤ ├─ A | ─┬─ | ─┤├─ | 2 | A |
| 3 | ─┤ ├─ B | — | ─┤├─ | — | B |
| 4 | ─┐ | ─┐ | — | 4 | — |
| 5 | └┤ ├─ C | └─ | ─┤├─ | 2 | C |
| 6 | ─┤ ├─ D | — | ─┤├─ | — | D |
| 7 | ─┴─○─ G | ─┴─ | ─○─ | 4 | G |

In the Table 2(B), the symbols "-" mean that there is nothing to be stored.

From the Table 2(B), in the case where there is a branch to the below or from the above, the column at that time is stored in the column portion of the instruction.

Next, the operations in the case where those instructions are read out of the main memory so that they may be put into practice are tabulated in Table 3, as follows:

TABLE 3

| Address | Sequence Instruction | Operation |
|---|---|---|
| 1 | SBS ├─ | 1 1 ⟶ ACC |
| 2 | ─┤ ├─ A | 1 (ACC) ⟶ $R_2$ |

TABLE 3-continued

| Address | Sequence Instruction | Operation |
|---|---|---|
| 3 | ⊣ ⊢ B | ② (A) . (ACC) ⟶ ACC <br> ① (B) . (ACC) ⟶ ACC |
| 4 | ⊐ | ① (ACC) ⟶ R$_4$ <br> ② 0 ⟶ ACC |
| 5 | ⊔ ⊢ C | ① (ACC) + R$_2$ ⟶ ACC <br> ② (C) . (ACC) ⟶ ACC |
| 6 | ⊣ ⊢ D | ① (D) . (ACC) ⟶ ACC |
| 7 | ⊥─○─ G$_{20}$ | ① (ACC) + R$_4$ ⟶ ACC <br> ② (ACC) ⟶ G$_{20}$ <br> ③ 0 ⟶ ACC |

In the Table 3, letter $R_i$ indicates the i-th bit of the column register 705 of FIG. 7.

More specifically, the instruction of the first address is read out and stored in the instruction register 702. If, first of all, the branch information 715 is decoded by the decoder 706, the level "1" is set as an initial value in the ACC because the information is at an SBS (i.e., sequence block start). With this instruction, however, the contact portion 716, the column portion 714 and the address portion 717 have no meaning. Then, the instruction of the second address is read out. Since the branch portion has its branch at BR$_{11}$, the content of the ACC is stored in the bit position R$_2$ as shown at the column (see Table 2B) register. Since, moreover, the contact is CTA and the address is A, the AND operation between the content of the ACC and the value at the input contact A is taken and fed to the ACC.

Next, with the instruction of the third address, since there is no branch but the contact and address are CTB and B, respectively, the AND operation between the content of the ACC and the value at the input contact B is taken and fed to the ACC.

Next, with the instruction of the fourth address, since the branch portion has its downward branch at BR$_{12}$, the content of the ACC is stored at the bit position R$_4$ as shown by the column (Table 2B). Since, moreover, there is no rightward connection, the ACC is cleared to the level "o".

Next, the instruction of the fifth address is read out. Since the branch portion has its branch from the above at BR$_{21}$, the operation between the content of the ACC and the register R$_2$ corresponding to the bit position shown at the column is taken and stored in the ACC. Then, since the contact and address are CTC and C, the AND operation between the content of the ACC and the value at the input contact C is taken and fed to the ACC.

Next, with the instruction of the sixth address, since there is no branch but the contact CTD and the address D, the AND operation between the content of ACC and the value of the input contact D is taken and fed to the ACC.

Next, with the instruction of the seventh address, since the branch portion has its branch from above at BR$_{22}$, the OR operation between the content of the bit position R$_4$ as shown at the column (Table 2B) and the content of the ACC is taken and fed to the ACC. Since the contact and address are CTG and G$_{20}$, respectively, the content of the ACC is fed to the output relay G$_{20}$.

As has been understood from the above, since those bits R$_1$, R$_2$ and so on of the column register, which are set in the first row, never fail to be used in the subsequent second row, such a column register may be of the type in which the bit number of the register corresponds to the columns.

Since, however, the system of FIG. 7 has a column portion in the instructions, there arises another difficulty, resulting from the fact that when the sequence circuit is changed from that of FIG. 2 to that of FIG. 3 one column has to be added so that changes are imparted to the columns of all instructions.

In order to eliminate the difficulties thus far described, the present invention is made to effect the processing with the use of a FIFO register without any provision of the column, as will be described in detail in the following.

Figure 8:
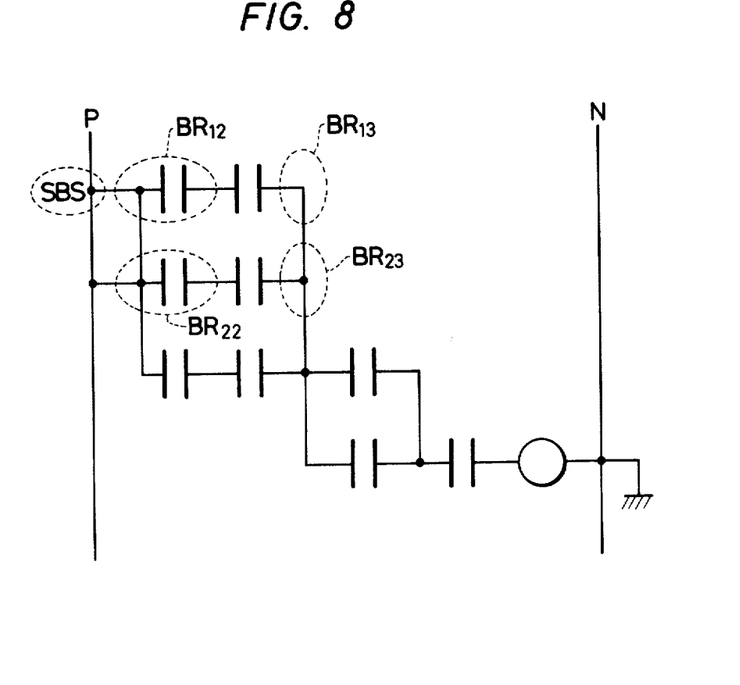
FIG. 8 shows an example of the sequence circuit, on which the present invention is based.
Figure 9:
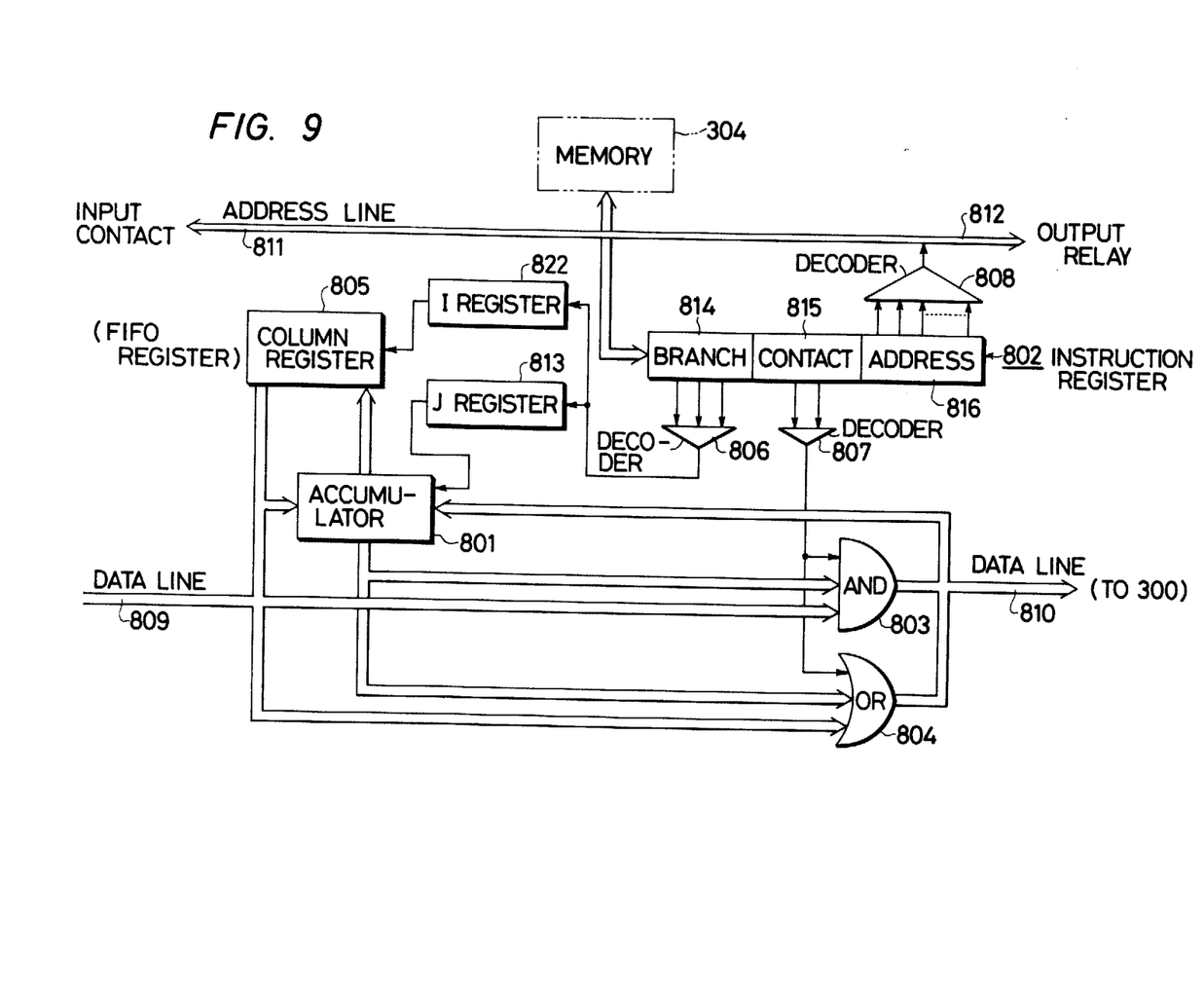
FIG. 9 is a block diagram showing the circuit construction of a concrete embodiment of the present invention.

FIGS. 8 and 9 show the embodiments, respectively, in which the sequence circuit and the FIFO register are employed.

In the sequence circuit, as shown in FIG. 8, there is provided at the lefthand side a common line P, which is at a positive potential P, and at the righthand side a common line N is provided which is grounded. For simplicity of discussion, it is assumed that the electric current never fails to flow from the left to the right and then from above to below.

In the SBS, ACC = 1 is set as an initial value, and the I and J registers indicating the FI and FO points of the FIFO column register, respectively, are set at their initial values.

The processing for the first row is performed from the left to the right, and the processing for the second row is started at the lefthand common line.

At this time, in the elements having a downward branch, i.e., in the BR$_{12}$ and BR$_{13}$ of the first row of example of FIG. 8, the value of the ACC at that time is stored in the bit position in register 805 shown in the I register the point of the I register is advanced. In the elements having branches from the above, i.e., in the BR$_{22}$ and BR$_{23}$ of the second row, on the other hand, the value taken out of the bit position in the register 805 shown by the J register is fed to the ACC for operational purposes. After that, the points of the J register are renewed. Since, in this instance, the BR$_{22}$ and BR$_{23}$ have branches extending downwardly in addition to those from above, it is quite natural that the value of the ACC be stored in the bit position shown by the I register.

It is determined here that the ladder diagram is processed from the left to the right and then from above to below. Therefore, as the above processing is followed for all the rows, the value having been fed first to the column register never fails to be fed first out upon the processing of the corresponding elements requiring it. Thus, it is sufficient to provide only one column register having a bit number equal to that of the columns.

In FIG. 9: numeral 802 indicates an instruction register having a branch portion 814, a contact portion 815 and an address portion 816; numerals 806, 807 and 808 designate decoders; numeral 801 designates an accumulator; numeral 805 designates a column register; numeral 803 designates an AND gate; numeral 804 identifies an OR gate; numeral 809 identifies an input contact data line; numeral 810 designates an output relay data line; numeral 811 identifies an input contact address line; and numeral 812 identifies an output relay address line. Moreover, numerals 822 and 813 indicate an I register and a J register, respectively.

The instructions fed from the memory are stored in the instruction register 802, and the content of the branch portion 814 is decoded by the decoder 806 so that the control signals are fed to the I register 822, if there is a branch extending downward, and to the J register 813 if there is a branch from the above. Thus, the content of the ACC 801 is stored in the column register 805, or the reverse reading operation is carried out from the column register 805 to the ACC 801. The input contact condition from the input device is fed through the input data line 809, so that the AND operation is performed with the value of the ACC by means of the AND gate 803 or so that the OR operation is performed therewith by means of the OR gate 804. Either of the results is fed to the output data line 810.

Here, the output data line 810 develops a signal of one bit. The one-bit signal is used as a selection signal to display the on-state or off-state condition of each of contacts A, B, C of the sequence diagram shown in FIG. 5, for example. The on-state display strengthens the intensity of display luminance of a relay symbol on the CRT screen. The off-state display weakens the intensity of the symbol luminance. The ladder diagram itself is read out and displayed on the CRT screen by a separate circuit device, the description of which is omitted here for simplicity.

The signals of the contact portion 815 of the instruction register 802 are decoded by the decoder 807 so that the control signals are fed to the AND gate 803 or the OR gate 804.

The signals of the address portion 816 of the instruction register 802 are decoded by the decoder 808 so that they are fed to the input contact address line 811 or to the output relay address line 812.

Figure 10:
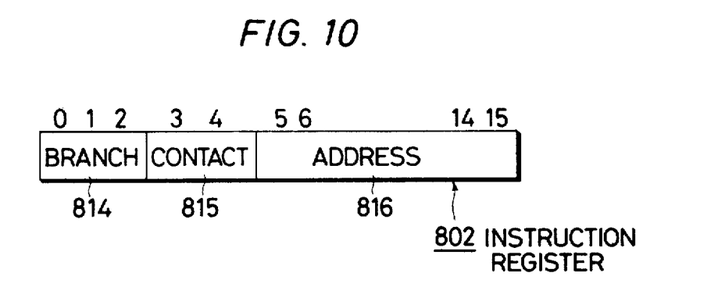
FIG. 10 shows an embodiment of an instruction register.

A detailed explanation will be made in the following on the basis of the actual data construction. FIG. 10 shows the data construction, in which the instruction register 802 has sixteen bits, the branch portion 814 has three bits, the contact portion 815 has two bits and the address portion 816 has eleven bits. The example of the content of the branch according to the internal definition of the instruction register 802 thus constructed will be tabulated in the following Table 4.

TABLE 4

| Branch | Symbol | Processing |
|---|---|---|
| 000 | — | NOOP |
| 001 | ┬ | (1) ACC ⟶ $R_i$  (2) RR(i) ⟶ i |
| 010 | BB ├ | (1) 1 ⟶ ACC |
| 011 | ┐ | (1) ACC ⟶ $R_i$  (2) 0 ⟶ ACC |
|  |  | (3) RR(i) ⟶ i |
| 100 | └ , ┴ | (1) ACC + $R_j$ ⟶ ACC |
|  |  | (2) RR(j) ⟶ j |
| 101 | ├ , ┼ | (1) ACC + $R_j$ ⟶ ACC |
|  |  | (2) ACC ⟶ $R_i$  (3) RR(j) ⟶ j |

TABLE 4-continued

| Branch | Symbol | Processing |
|---|---|---|
|  |  | (4) RR(i) ⟶ i |
| 110 | SBS ├ | (1) 1 ⟶ ACC  (2) 8000 ⟶ i |
|  |  | (3) 8000 ⟶ j |
| 111 | │ , ┤ | (1) ACC + $R_j$ ⟶ $R_i$ |
|  |  | (2) 0 ⟶ ACC  (3) RR(j) ⟶ j |
|  |  | (4) RR(i) ⟶ i |

Note:
BB indicates the head of one block diagram, and SBS indicates the head of the whole sequence diagram.

On the other hand, the operations of the contact will be exemplified in the following Table 5. The symbols represented in Tables 4 and 5 are merely illustrated according to the processings. The conversion and display of information read out of the memory into symbols are performed by a separately-provided device.

TABLE 5

| Contact | Symbol | Processing |
|---|---|---|
| 00 | ─┤├─ | (1) (EA) . ACC ⟶ ACC |
| 01 | ─┤╱├─ | (1) (EA) + ACC ⟶ ACC |
| 10 | ─ ─ | (1) ACC ⟶ (EA)  (2) 0 ⟶ ACC |
| 11 | ─⇩─ | (1) ACC ⟶ (EA)  (2) 0 ⟶ ACC |

Note:
(EA) indicates the content shown in the address.

Here: letters ACC indicate an accumulator; $R_i$ indicates the bit position of the column register by the I register; and $R_j$ indicates the bit position of the column register by the J register. Letters i and j indicate the I register and the J register, respectively. Letters RR(i) express the operations, by which the content of the I register is shifted one bit to the right so that the overflow from the LSB (i.e., least significant bit) may be stored in the MSB (i.e., most significant bit). On the other hand, letters RR(j) express the similar operations for the J register to those of the letters RR(i). Number 8000 in hexadecimal notation is stored as an initial value in the I and J registers in accordance with the SBS instruction. Among the contacts shown in Table 5, the contact signals "00" and "01" are used to control the AND gate and the OR gate in FIG. 9 as stated hereunder.

Figure 11:
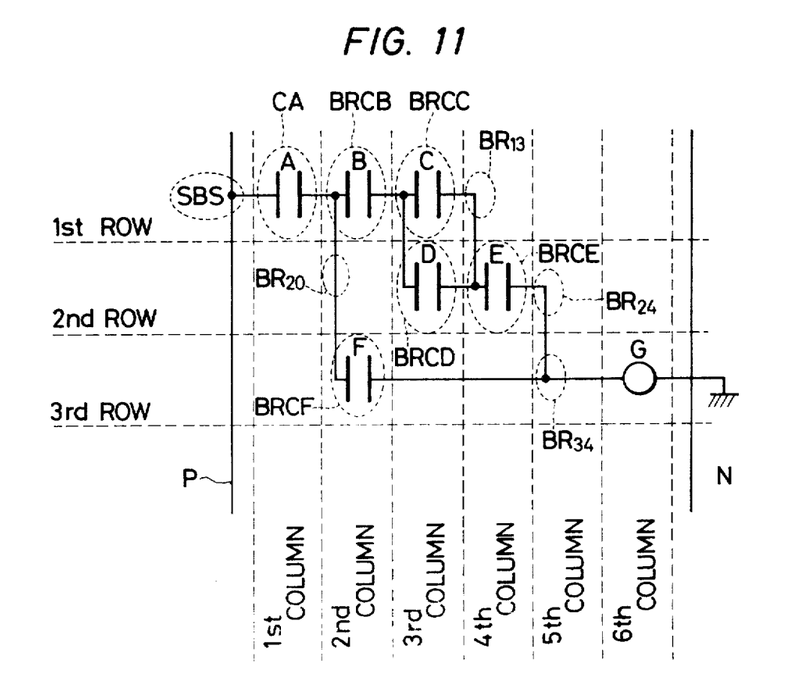
FIG. 11 shows a sequence circuit for illustrating the present invention.

The operations of FIG. 9 will be described in the following by taking an actual sequence circuit as an example. FIG. 11 shows a sequence circuit to be used in the following description with the input contact conditions of A=1, B=0, C=1, D=1, E=0 and F=1. The manner, in which the conversions into the respective instruction words are made, will be tabulated in the following Table 6. On the other hand, the variations in the data of the column register 805 and the I and J registers 822 and 813 of the FIFO system when the instruction words are to be carried out will be illustrated in items ① to ⑭ of FIG. 12.

TABLE 6

| Accomplishing Order of Instns. | Symbol | Explanation of Operations |
|---|---|---|
| ① | SBS ⊢ | (i) ACC = 1  (ii) 8000 ⟶ i |
|  |  | (iii) 8000 ⟶ j  Setting of Initial Value |
| ② | ─┤A├─ (CA) | (i) (ACC) . A ⟶ ACC  ACC = 1 |
| ③ | ─┤┤B├─ (BRCB) | (i) ACC ⟶ R$_i$  Feed of ACC to Column Register |
|  |  | (ii) RR(i) ⟶ i  1 bit Shift of I Register to right |
|  |  | (iii) (ACC) . B ⟶ ACC  ACC = 0 |
| ④ | ─┤┤C├─ (BRCC) | (i) ACC ⟶ R$_i$  Feed of ACC to Column Register |
|  |  | (ii) RR(i) ⟶ i  1 bit Shift of I Register to right |
|  |  | (iii) (ACC) . C ⟶ ACC  ACC = 0 |
| ⑤ | ┐(BR$_{13}$) | (i) ACC ⟶ R$_i$  Feed of ACC to Column Register |
|  |  | (ii) 0 ⟶ ACC  Clearance of ACC |
|  |  | (iii) RR(i) ⟶ i  1 bit Shift of I Register to right |
| ⑥ | |(BR$_{20}$) | (i) ACC + R$_j$ ⟶ R$_i$  Taking out of Column Register, Taking OR with ACC and Feed it to Column Register |
|  |  | (ii) 0 ⟶ ACC  Clearance of ACC |
|  |  | (iii) RR(j) ⟶ j  1 bit Shift of J Register to right<br>RR(i) ⟶ i  1 bit Shift of I Register to right |
| ⑦ | └┤D├─ (BRCD) | (i) ACC + R$_j$ ⟶ ACC  ACC = 0  (ii) RR(j) ⟶ j |
|  |  | (iii) (ACC) D ⟶ ACC  ACC = 0 |
| ⑧ | ─┴┤E├─ (BRCE) | (i) ACC + R$_j$ ⟶ ACC  ACC = 0 |
|  |  | (ii) RR(j) ⟶ j  1 bit Shaft of J Register to right |
|  |  | (iii) (ACC) . E ⟶ ACC  ACC = 0 |
| ⑨ | ┐(BR$_{24}$) | (i) ACC ⟶ R$_i$  Feed of ACC to Column Register |
|  |  | (ii) 0 ⟶ ACC  Clearance of ACC |
|  |  | (iii) RR(i) ⟶ i  1 bit Shift of I Register to right |
| ⑩ | └┤F├─ (BRCF) | (i) ACC + R$_j$ ⟶ ACC  ACC = 1 |
|  |  | (ii) RR(j) ⟶ j  1 bit Shift of J Register to right |
|  |  | (iii) (ACC) . F ⟶ ACC  ACC = 1 |
| ⑪ | — | No Operation |
| ⑫ | — | No Operation |
| ⑬ | ⊥ | (i) ACC + R$_j$ ⟶ ACC  ACC = 1 |
|  |  | (ii) RR(j) ⟶ j  1 bit Shift of J Register to right |
| ⑭ | ─○G─ | (i) ACC ⟶ G  Feed of ACC to G |
|  |  | (ii) 0 ⟶ ACC  Clearance of ACC |

First of all, the sequence circuit shown in FIG. 11 is expanded into the aforementioned sequence block. In FIG. 12, on the other hand, numerals ①, ②, ..., ⑭ at the lefthand side indicate the order for carrying out the program, and the corresponding symbols indicate the respective instruction words in the symbols. The operations are carried out in the order of (i), (ii) and (iii) in the Table 6.

Here, letter i indicates the point to be fed to the column register designated by the I register, and letter j indicates the point to be taken out of the column register designated by the J register, both of the registers having sixteen bits.

Both of the I and J registers are set with the value of 8000 in the hexadecimal notation as their initial values.

The operation of ACC→$R_i$ means that the content of the ACC is fed to such a bit position on the column register R as is indicated at the i-th order of the I register.

The operation of ACC+$R_j$→$R_i$ means that the OR operation is preformed between the content of the ACC and the content of the bit position of the column register, which is indicated at the j-th order of the J register, and is stored in the bit position of the column register, which is indicated at the i-th order of the I register.

Letters RR(i) and RR(j) represent operations, in which the content of the I or J register is shifted one bit to the right and is supplied with the value "0" from the left end.

The changes in the contents of the column register and the I and J registers when the above program is carried out are illustrated in FIG. 12.

As has been described, the conditions of A=1, B=0, C=1, D=1, E=0 and F=1 are assumed as those of the input contacts. In FIG. 12, moreover, the symbol x means an arbitrary condition i.e., that either level "0" or "1" is acceptable. The numerals ① to ⑭, as appearing at the lefthand side of FIG. 12, correspond to the order of the aforementioned respective instruction words, whereas the conditions of the registers indicate the conditions after the respective instruction words are carried out.

First of all, the SBS in FIG. 11 is the head of one ladder diagram in accordance with the instruction accomplishing order ① of the Table 6 and is connected with the common line P. The operations (i) ACC=1, (ii) 8000→i and (iii) 8000→j indicate that the value 8000 in the hexadecimal notation is set as the initial value by the initializations of the I and J registers 812 and 813.

Figure 12A:
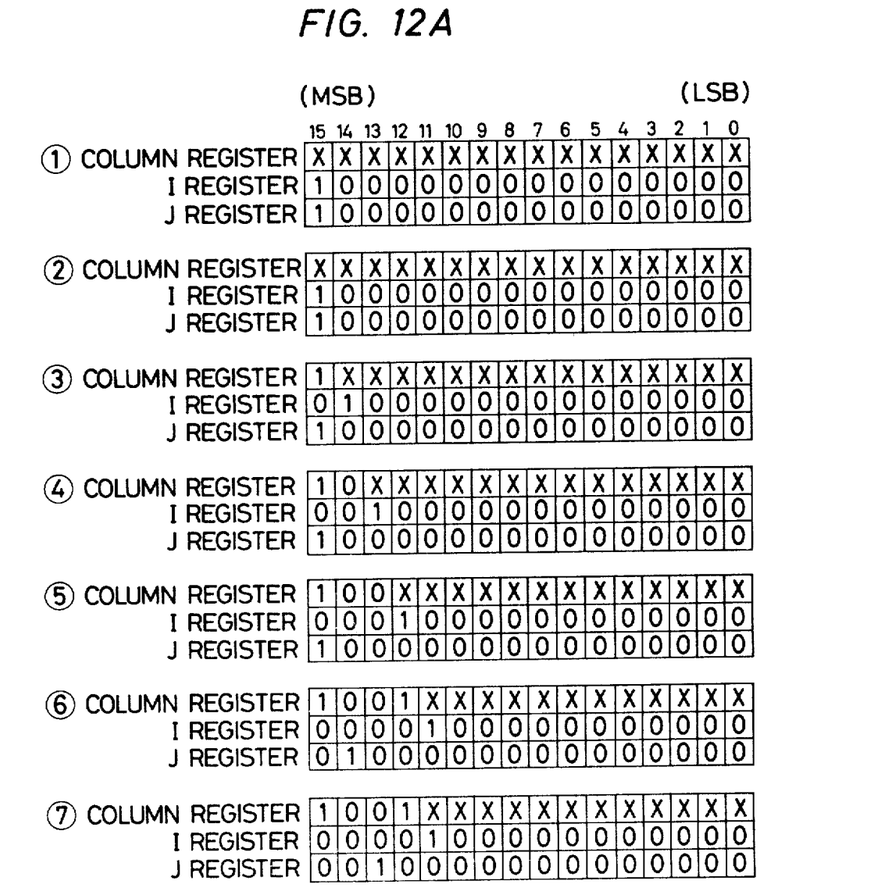
FIGS. 12A and 12B are diagrams for illustrating the operating conditions of FIFO column registers and I and J registers according to the flow of data for explaining the operating processes of the present invention.

The highest bit of the I and J registers at the item 1 in FIG. 12A assumes the value ① which implies the initialized condition at the value 8000 in hexadecimal notation, i.e., the condition at the end of the operations (i) to (iii).

The second instruction accomplishing order ② indicates the case, in which the ladder diagram CA of FIG. 11 is to be processed. In the operation (i), the AND operation is performed between the (ACC) processed in the operation (i) of the order ① and the condition of the contact A (wherein A=1 is assumed) so that the result is stored in the ACC. Here, the relation of ACC=1 holds. There arises no change in the column register and the I and J registers.

In the next instruction accomplishing order ③, the processing is accomplished for the case of the ladder diagram BRCB of FIG. 11, i.e., for the case of the provision of the branch.

In the operation (i), the content of the ACC is fed to the column register. More specifically, for ACC=1, the column register is set at the value "1". In the operation (ii) of RR(i)→i, the content of the I register is shifted one bit to the right. As has been described, the I register indicates the bit position to be fed to the column register. The AND operation is performed between the (ACC) and the condition of the contact B, and the relation of ACC=0 holds because of the relation of B=0, as has been described before. In the order ③ of FIG. 12A, the value "1" is written in the column register, and the I register indicates the bit position to be written in the column register in the case of the next branch, i.e., that the 14-th bit has the value "1".

In the instruction accomplishing order ④, the processing of the BRCC of FIG. 11 is carried out. Since there is the branch, the content of the ACC is fed to the column register. Since, at this stage, the relation of ACC=0 holds (in the operation of the aforementioned instruction accomplishing order ③), the value "0" is fed at the 14-th bit, as seen from the order 4 of FIG. 12A. This implies that there is the "0" information as well as the branch. Then, the I register is shifted one bit to the right. This implies that the next branch information is stored in the 13-th bit of the column register. Then, the AND operation is performed between the contact information of C=1 and the ACC, and the relation of ACC=0 holds in this instance. On the other hand, the J register is left under the initialized condition.

In the next instruction accomplishing order ⑤, the processing of $BR_{13}$ of FIG. 11 is carried out. Because of the existence of the branch, the content of the ACC is written in the 13-th register of the column register, in which the content of the ACC is designated by the I register. For the aforementioned order ④, the relation of ACC=0 holds, and the value "0" is written. Although the $BR_{13}$ is different from the other BRCB and BRCC, the processing of the branch is accomplished similarly to those of the aforementioned orders ③ and ④ while assuming that there is a branch to the below. The operation of RR(i)=i indicates that the shift processing of the I register is accomplished similarly to the branch processing of the previous order so that the next branch information signals are fed to the 20-th bit of the column register, as illustrated at the order 5 of FIG. 12A. The processings thus far described are those for the first row shown in FIG. 11.

The following explanation is directed to the instruction accomplishing order ⑥. In this operation, the column register signals at the bit position, as shown by the J register, are first fed to the ACC so that the OR operation is performed with the content of the ACC. The result is fed to the column register. Since the ACC has been cleared in the order ⑤, the value "1" is resultantly written in the 20-th bit of the column register. In the order ⑥, the processing of the $BR_{20}$ of FIG. 11 is carried out, but the processing of the second row is an intermediate one from the first to the third row. As a result, as illustrated in the operation (ii), the ACC is cleared, and the J register is shifted one bit to the right (RR(j)→j). A similar operation of RR(i)→i is carried out for the I register. Thus, as illustrated in the order ⑥ of FIG. 12A, the I register is written with the value "1" at its 8-th bit whereas the J register is written with the value "1" at its 14-th bit.

The order ⑦ will be described in the following in connection with the processing of the BRCD of FIG. 11. In this processing, the OR operation is performed between the ACC and the $R_j$, i.e., between the value "0" and the signal "0" of the column register at the position of the bit indicated by the J register, i.e., at the 14-th bit position, because the ACC has been cleared in the above order ⑥, so that the relation of ACC=0 results. Since there is no branch to the subsequent row, the I register is kept the same, and only the J register is shifted one bit to the right. As a result, the AND operation between the ACC and D (=1) assumes the value "0" so that the relation of ACC=0 holds. The conditions of the column register and the I and J registers at the time after the processing thus far described are illustrated in the order ⑦ of FIG. 12A.

The order ⑧ concerning the BRCE of FIG. 11 will be explained in the following. Like the order ⑦, the OR operation between the ACC and the $R_j$ assumes the value "0". Only the J register is shifted one bit to the right so that the AND operation between the ACC and the E assumes the value "0" (E=0). The conditions of the respective registers are illustrated in the order ⑧ of FIG. 12B.

Figure 12B:
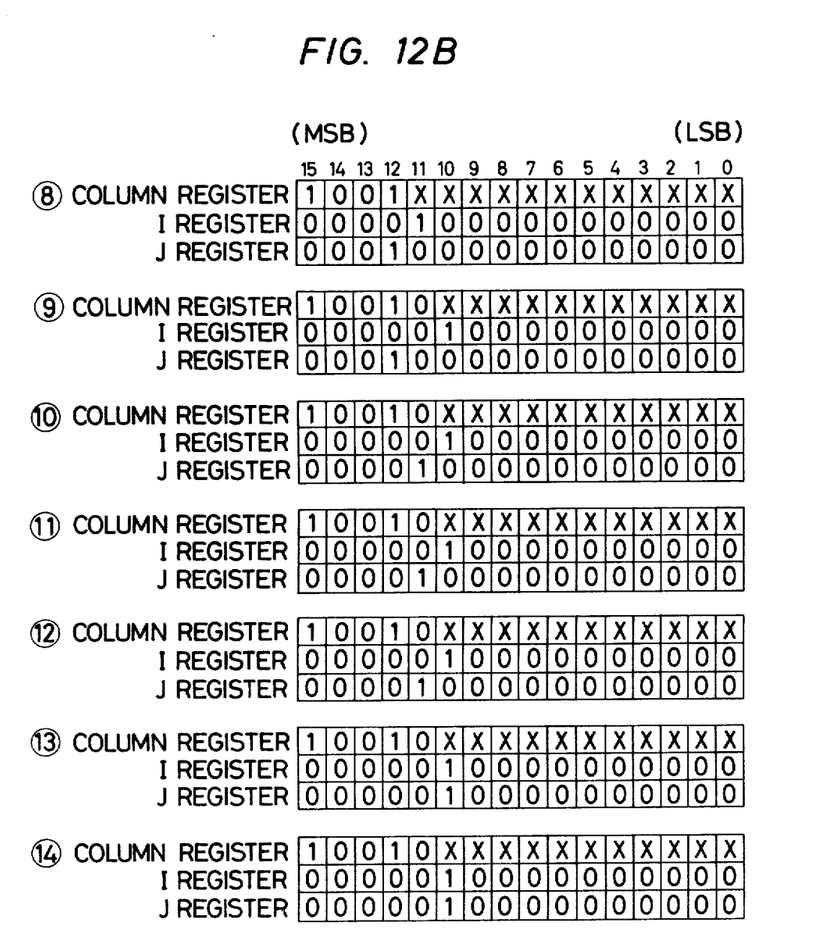

Next, the processing ⑨ concerning the $BR_{24}$ of FIG. 11 will be explained in the following. In this processing, only the branch to the subsequent row, i.e., to the third row exists so that similar processing to that of the $BR_{13}$ of the first row is carried out. As a result, the conditions illustrated in the order ⑨ of FIG. 12B are established.

The next processing ⑩ of the BRCF of FIG. 11 is essentially similar to that of the BRCD, i.e., ⑦. Therefore, the detail explanation is omitted here merely referring to the result that only the J register is shifted one bit, as illustrated in the order ⑩ of FIG. 12B.

In the orders ⑪ and ⑫, i.e., in the third and fourth columns of the third row, no signal processing is carried out.

The subsequent order ⑬ is directed to the processing of the $BR_{34}$ of FIG. 11. The OR operation is performed between the ACC and the signals of the column register of the bit indicated by the J register of the order ⑫, i.e., of the 11-th bit, and the result is set in the ACC. Then, since the relation of ACC=1 holds and there is no branch to the subsequent row, only the J register is shifted one bit to the right. The result is illustrated in the order ⑬ of FIG. 12B.

The final order ⑭ is an output generating order so that the content of the ACC is generated. Since the relation of ACC=1 is maintained up to the processing ⑬, the value "1" is generated, and the ACC is cleared (0→ACC), thus completing the processing of the ladder diagram.

As has been described hereinbefore in connection with the foregoing embodiment, by using a column register of the FIFO type, it is possible to provide a PLC which has no column in the mechanical words so that it can easily cope with the correction of the sequence program and so that the address space is accordingly enlarged.

Although the foregoing embodiment is equipped with only one accumulator, it should be understood that the present invention can also be applied to the embodiments which are equipped with two or more accumulators.

What we claim is:

1. A sequence program display control method for a stored-program sequence controller including memory means storing a plurality of predetermined sequence instructions for controlling a controlled-objective process in conjunction with a predetermined sequence ladder diagram including a plurality of relay contacts, said instructions including on-off commands for said relay contacts; input means for receiving condition signals indicative of the present state of various relay contacts of said sequence ladder diagram; operation control means for reading out said sequence instructions stored in said memory means and for generating output control signals for said controlled-objective process in response to said sequence instructions and the condition signals provided by said input means; output means for outputting said output signal from said operation control means to said controlled-objective process; and cathode ray tube display means connected to said operation control means for displaying the conditions of operation of said sequence program, said method comprising the steps of:

(a) storing instructions relating to a predetermined sequence ladder diagram in said memory means, said instructions for said ladder diagram being stored in an order corresponding to an array formed of a plurality of imaginary rows and a plurality of imaginary columns;

(b) reading out the contents of said memory means relative to the first row of the diagram in a sequence successively from the first column to the last column, and repeating a similar reading operation relative to the second row to the last row successively;

(c) inputting instructions read out in said reading step including branch information, on-off commands in the form of contact-state information and address information bits into respective bit positions of an instruction register;

(d) decoding said inputted branch information, and inputting a control signal into a first register when said branch information indicates a branch or join to a subsequent row and inputting the same control signal into a second register when said information indicates a branch or join from the previous row, and inputting a display signal corresponding to a branch information bit pattern into an accumulator;

(e) storing, when a branch to the subsequent row is present in the decoded branch information, the value of said accumulator in a bit position of a first-in, first-out column register corresponding to the stored bit position of said first register and thereafter shifting the content of said first register by one bit;

(f) inputting to the accumulator, when a branch or a contact from the previous row is present in the decoded branch information, the bit content of the column register corresponding to the stored bit position of said second register and thereafter shifting the content of said second register by one bit, and (g) performing a logical operation on the condition signal inputted to said input means, a signal from said accumulator and a signal obtained by decoding of said contact-state information in said instruction so as to produce a display information signal to be applied to said CRT display means.

2. A sequence program display control method according to claim 1, wherein said column register is cleared for each sequence ladder diagram to be displayed.

3. A sequence program display control method according to claim 1, wherein each of said first and second registers has a number of bit positions at least equal to the number of imaginary columns in said sequence ladder diagram and the value "1" is stored as the initial value in the first bit position of said first and second registers indicative of the bit position of said column register for each sequence ladder diagram to be displayed.

4. A stored program sequence control system comprising
memory means storing a plurality of predetermined sequence instructions for controlling a controlled-objective process in conjunction with a predetermined sequence ladder diagram including a plurality of relay contacts, said instructions including branch information concerning branch points in said diagram, on-off commands in the form of contact state information and address information;

input means for receiving condition signals indicative of the present state of various relay contacts of said sequence ladder diagram;

operation control means for reading out sequence instructions stored in said memory means and for generating output control signals for said controlled-objective process in response to said sequence instructions and the condition signals provided by said input means, including an instruction register, means for sequentially reading said instructions from said memory means into said instruction register, decoding means for decoding the branch information which forms part of the instructions contained in said instruction register to detect an indication therefrom of the presence of a branch point and an indication of whether a first or second of two opposite branch directions is designated, an accumulator, means for inserting an initial value in said accumulator based on the starting point of said sequence ladder diagram identified by the first sequence instruction read from said memory means, first and second control registers, a multi-stage column register, means responsive to said decoding means for applying the contents of said accumulator into column register at a location designated by said first control register when a branch point in a first branch direction is designated by the instruction and for transferring into said accumulator the contents of said column register at the location designated by said second control register when a branch point in a second branch direction is designated by the instruction, means for initially presetting said first and second control registers to predetermined values, means for shifting the contents of said first control register each time the contents of said accumulator are transferred to said column register and for shifting the contents of said second control register each time contents of said column registers are transferred to said accumulator, and logic means for producing display information signals on the basis of a condition signal received from said input means, a signal from said accumulator and the control state information in said instructions; and display means responsive to said display information signals for displaying the conditions of operation of said sequence program.

5. A stored program sequence control system according to claim 4, wherein said column register and said first and second control registers have the same number of stages.

* * * * *